United States Patent [19]

Cain et al.

[11] Patent Number: 5,756,143
[45] Date of Patent: May 26, 1998

[54] TRIGLYCERIDES, RICH IN POLYUNSATURATED FATTY ACIDS

[75] Inventors: Frederick William Cain, Voorburg, Netherlands; Gerald Patrick McNeill, Rushden; Stephen Raymond Moore, Thrapston, both of Great Britain

[73] Assignee: Loders-Croklaan B.V., Wormerveer, Netherlands

[21] Appl. No.: 639,504

[22] Filed: Apr. 29, 1996

[30] Foreign Application Priority Data

Apr. 28, 1995 [EP] European Pat. Off. ............ 95302943

[51] Int. Cl.$^6$ .................................................. A23D 9/00
[52] U.S. Cl. ........................................ 426/606; 426/607
[58] Field of Search ..................................... 426/606, 607

[56] References Cited

U.S. PATENT DOCUMENTS 5,151,291  9/1992  Tokairin et al. ..................... 426/581

FOREIGN PATENT DOCUMENTS

| 0 271 909 | 6/1988 | European Pat. Off. ........ A61K 31/23 |
| 0 298 293 | 1/1989 | European Pat. Off. . |
| 0 321 777 | 6/1989 | European Pat. Off. ........ C12P 7/64 |
| 0 609 001 | 8/1994 | European Pat. Off. ........ A23L 1/30 |
| 9424889 | 10/1994 | Netherlands . |

OTHER PUBLICATIONS

Fennema 1985 Food Chemistry, second edition Marcel Dekker New York p. 223.
Patent Abstracts of Japan, JP5095792, Apr. 1993.
Endo et al, Biosci. Biotech. Biochem., 57(12), 2202–2204 (1993).
Toyoshima et al, Journal of the Japan Oil Chemists' Society, 42(1), 30–35 (1993).
Huang et al, JOACS, 71(11), 1277–1280 (1994).
Adachi et al, Journal of Fermentation and Bioengineering, 75(4), 259–264 (1993).
Tanaka et al, JAOCS, 71(3), 331–334 (1994).
Bech et al, JAOCS, 72(2), 239–243 (1995).

*Primary Examiner*—Carolyn Paden
*Attorney, Agent, or Firm*—Pillsbury Madison & Sutro LLP

[57] ABSTRACT

Triglycerides, having at least two long chain polyunsaturated fatty acids $L_1$ and $L_2$, from which at least one is present for more than 20 wt %, while the weight ratio $L_1:L_2$ is at least 2 and which triglycerides also contain mono- and di-unsaturated fatty acids with 18 carbon atoms, such that $C_{18:2}$ is present for more than 7 wt %, and $C_{18:1}$ is present for more than 30 wt %, while at least 5 wt % of the mono- and/or diunsaturated fatty acids with 19 C-atoms are bonded on a triglyceride molecule, wherein at least $L_1$ and/or $L_2$ are present, display a number of beneficial properties (higher oxidative stability, healthier, improved $$\frac{w-3}{w-6}$$

ratio).

18 Claims, No Drawings

TRIGLYCERIDES, RICH IN POLYUNSATURATED FATTY ACIDS

BACKGROUND OF THE INVENTION

According to EP 265 699 fats with a superior digestibility and absorptivity are obtained, when these fats are composed of triglycerides having a specific amount of $C_8$ to $C_{14}$ fatty acid residues at the 2-position, while residues with $C_{18}$ or higher fatty acids are bonded at the 1.3-positions. Typical examples of the $C_{18}$ and higher fatty acids are polyunsaturated fatty acids, such as arachidonic acid, eicosapentenoic acid and dodecahexenoic acid. However nothing is disclosed about fat compositions that combine in the fat mono- or diunsaturated fatty acid residues and at least two different long chain polyunsaturated fatty acid residues.

In WO 90/04012 it is disclosed that triglycerides that contain saturated $C_8/C_{10}$ fatty acid residues in 1.3 and simultaneously a polyunsaturated fatty acid residue (in particular DHA) in the 2-position, have beneficial nutritional properties, in particular for enteral or parenteral purposes. However again, nothing is disclosed about fat compositions that contain in the fat specific amounts of mono- or diunsaturated and two different polyunsaturated fatty acid residues.

From Endo c.s. in Bioscience Biotechn Biochem 57 (12) 1993, pages 2202–2204 it is known, that incorporation of oleic acid groups into sardine oil leads to a product with improved oxidation rate. This incorporation of oleic acid is achieved by an enzymic process, applying *Candida cylindracea* or lypozyme as the enzyme. It is taught that starting from sardine oil with about 8% DHA and 12% EPA the conversion products have decreased levels of DHA and EPA.

Therefore, above document does not disclose triglycerides that contain at least 20 wt % of a most abundant polyunsaturated fatty acid in combination with at least 7 wt % $C_{18:2}$, and with at least 30 wt % $C_{18:1}$ and wherein part of the $C_{18:1}$ and $C_{18:2}$ are bonded on a triglyceride molecule, wherein also $L_1$ and/or $L_2$ is present.

U.S. Pat. No. 5,151,291 discloses triglycerides that are rich in EPA and that also contain "higher fatty acid residues". The higher fatty acid residues are defined in away, which also incorporates $C_{18:1}$; $C_{18:2}$ and DHA. The products obtained must combine a high EPA level with a high melting point in order to make them suitable as margarine-fat. Because of above requirements the triglycerides never will combine more than 20% of a most abundant long chain polyunsaturated fatty acid with the presence of a second most abundant LCPUFA in a ratio between these two LCPUFA's of more than 2, while simultaneously more than 7 wt % $C_{18:2}$ and more than 30 wt % of $C_{18:1}$ will be present.

From EP 271,909 triglycerides are known comprising two or more triglycerides with the formula:

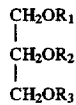

```
CH2OR1
|
CH2OR2
|
CH2OR3
``` wherein $R_1$; $R_2$ and $R_3$ can be the same or different and wherein each is an acyl group with 20–22 C-atoms, including saturated, unsaturated and polyunsaturated fatty acid residues; an acyl group with 14–18 C-atoms, including saturated and unsaturated fatty acid residues, such as oleic acid and linoleic acid, or an acyl group with 6–12 C-atoms, and wherein the $C_{20}$–$C_{22}$; the $C_{14}$–$C_{18}$ and $C_6$–$C_{12}$ fatty acids are present in a mole-ratio of: (1–20):(30–50):(40–60). Therefore, these triglycerides always contain a mixture of above three types of fatty acids.

Nothing is disclosed about the presence of two different LCPUFA's in a specific ratio, nor about the presence of at least 20 wt % of the most abundant LCPUFA.

From WO 94/00044 it is known that fatblends that contain unhardened fish oil have significant health benefits. Fish oil often contains appreciable amounts of two different polyunsaturated fatty acids, e.g. DHA and EPA. However it is also known that fish oil has a number of draw backs, such as a low oxidative stability (e.g. noticed as off-taste during storage at ambient temperature).

Above drawbacks makes it difficult to apply fish oil as a base for low SAFA liquid oils with an acceptable oxidative stability.

SUMMARY OF THE INVENTION

We have performed a study to find out, whether fat compositions existed, that could overcome the draw backs of the known fat compositions, while they would retain the beneficial effects of the presence of relatively high amounts of polyunsaturated fatty acids. This study has resulted in the finding of novel fats, that combine the following beneficial product properties:

our novel fats display better oxidation stability than triglycerides with similar compositions, however not having our levels of mono- or diunsaturated fatty acids present. In particular the triglycerides, containing an oleic group display good oxidative stability;

our novel fats are better for the development of the brain, in particular when consumed by infants. This effect is due to the relatively high levels of dodecahexenoic acid (DHA) in our fats;

our novel fats also can contain relatively high levels of eicosapentenoic acid (EPA), which makes our fats healthier, due to the effect of EPA on coronary diseases;

Our novel fats have an improved $$\frac{w-3}{w-6}$$

balance, because of the presence of w-3 fatty acid residues, such as EPA or DHA, and because of the presence of w-6 fatty acid residues, such as linoleic acid;

So the use of our novel fats makes it possible to come to a healthier liquid oil, that contains both mono- or diunsaturated fatty acid residues and polyunsaturated fatty acid residues, resulting in an oil with an improved $$\frac{w-3}{w-6}$$

balance, that has an unexpectedly high oxidative stability and wherein hardly any saturated fatty acid residues are present.

So our inventions concerns with novel fats, that display one or more of above beneficial effects.

Our novel fats can be described as a triglyceride-composition, comprising at least two long chain polyunsaturated fatty acids $L_1$ and $L_2$, both having at least 3 unsaturations and having at least 20 carbon atoms from which $L_1$ is the most abundant and $L_2$ is the second most abundant, wherein the triglyceride composition contains at least 20 wt % of $L_1$, while the weight ratio $L_1:L_2$ is at least 2, and the triglyceride composition also contains mono- and di-unsaturated fatty acids with 18 carbon atoms, such that the amount of $C_{18:2}$ unsaturated fatty acids is more than 7 wt %, and the amount of $C_{18:1}$ unsaturated fatty acid is at least 30 wt %, while at least 5 wt % of the mono- and/or di-unsaturated fatty acids with 18 carbon atoms are bonded on a triglyceride molecule, wherein at least $L_1$ and/or $L_2$ are present.

Preferred fats are triglyceride compositions, wherein the amount of $L_1$ is more than 30 wt %, while the weight ratio $L_1:L_2$ is at least 3, while triglyceride compositions wherein the amount of $L_1$ is at least 40 wt % and the weight ratio of $L_1:L_2$ is at least 3.5 are even more preferred.

The amount of mono-unsaturated $C_{18:1}$ in our fats is preferably at least 30 wt %, more preferably at least 40 wt %. The amount of di-unsaturated fatty acid $C_{18:2}$ is preferably more than 10 wt %, in particular mote than 15 wt %. Advantageously the weight ratio $C_{18:1}/C_{18:2}$ unsaturated fatty acids is more than 1, in particular more than 2.

The most abundant polyunsaturated fatty acid $L_1$ is preferably DHA (=$C_{22:6}$). The second most abundant polyunsaturated fatty acid $L_2$ advantageously is EPA ($C_{20:5}$) Very useful triglycerides are obtained, when $L_1$=EPA and $L_2$=DHA.

DETAILED DESCRIPTION OF THE INVENTION

Our triglycerides can be applied as such in foodproducts, however it can also be very suitable to blend our novel fats first, before applying them. Therefore part of our invention is also a blend of triglycerides, comprising 0.3–95 wt % of triglycerides and 99.7–5 wt % of a structuring fat, having saturated fatty acid residues with 12–24 carbon atoms.

Above blends suitably can be composed of 5–80 wt %, in particular 20–70 wt % of the triglycerides and 95–20 wt %, in particular 80–30 wt % of the structuring fat with saturated $C_{12}$–$C_{24}$ fatty acid residues.

Very useful blends are obtained if the structuring fat has a solid fat content (NMR-pulse; not stabilized) of more than 15 at 20° C., preferably more than 20.

Many types of structuring fat can be applied. However we prefer to use structuring fats selected from cocoa butter equivalents, cocoa butter, palm oil or fractions thereof, palmkernel oil or fractions thereof, interesterified mixtures of above fats or fractions or hardened components thereof.

The blends so obtained display a solid fat content (NMR-pulse; not stabilized) of 0–85, preferably 10–70, most preferably 20–60 at 5° C. and less than 30, preferably <20, most preferably <5 at 35° C. Although our fats already have an improved oxidative stability, we found that this stability can be further improved when our blends contain an effective amount of an oxidation stabilizer, selected from the group consisting of: natural or synthetic tocopherols, other natural anti-oxidants, BHT, BHA, free radical scavengers, enzymes with anti-oxidant properties.

Effective amounts can range from 100 ppm to 5 wt % (on fat).

Part of our invention are also the foodproducts, comprising a fat phase, such as spreads, margarine, cream alternative, infant food, chocolate, confectionery, bakery products, sauces, ice-creams, ice-cream coatings, cheese, soups, mayonnaise, dressings, enteral or parental products, wherein the fat phase contains the triglyceride composition or a blend of the triglyceride composition and the structuring fat.

Our fats can be obtained by preparing the pure triglycerides and blending these in the required ratios. However a very useful method for the preparation of our blends is an interesterification of a (non-hardened) fish oil with an unsaturated fatty acid or a triglyceride, high in the required mono- or diunsaturated fatty acid residue (e.g. high oleic sunflower oil). This interesterification can be performed by using an enzyme. In that case enzymes can be applied, that display a specificity for e.g. long chain polyunsaturated fatty acids over mono- or di-unsaturated fatty acids, or that display a preference for one long chain polyunsaturated fatty acid over another long chain polyunsaturated fatty acid.

In our example we have set out another possible interesterification method for the preparation of our novel fats. According to this method a fish oil is first subjected to a glycerolysis in the presence of a lipase. The crude reaction product obtained is enriched in long chain polyunsaturated fatty acids.

This crude product is reconverted to triglycerides by performing an interesterification, using on oil high in mono- and/or di-unsaturated fatty acids, such as maize oil. Other methods to prepare our novel fats are illustrated by our other examples.

LIST OF USED CODES AND THEIR EXPLANATION wf(TUNA)f=TUNAf=The olein fraction of semi refined tuna oil obtained by low temperature solvent fractionation, having at least 35% of DHA.

HOSF=High oleic sunflower oil.

SF=Sunflower oil.

CCB=Cocoa butter.

POf37=Partially hardened palm oil olein fraction melting point of 37° C.

CN=Coconut oil.

CNs=Coconut oil stearin fraction.

nPOm=Wet fractionated palm oil mid fraction.

df(PO)f=Dry fractionated palm oil olein fraction.

HS1=Hardstock=The stearin fraction of a chemical interesterified blend of fully hardened palm oil and a fully hardened palm kernel olein fraction.

SF=Sunflower oil.

PO=Palm oil.

in=Interesterified.

EXAMPLE I

A fish oil enriched in 20:5 and 22:6 is prepared by reacting menhaden oil (composition given in table 1.) with glycerol in the presence of *Pseudomonas cepacia* lipase at a temperature of 37° C. The ratio of oil to glycerol is 3 (wt/wt) and the quantity of lipase is 1% by weight on oil. 5% water by weight is present in the glycerol. After 48 hours the reaction is terminated by heating to 100° C. and the glycerol is separated from the reaction mixture. The triglycerides are separated from the glyceride fraction by adsorption of the partial glycerides and the free fatty acids (FFA) onto silica, to give the enriched oil of composition shown in table 1. This oil is interesterified with maize oil (composition in table 1.) using *Rhizomucor miehei*, to give the final product oil with a composition given in table 1. All the above processes are carried out under nitrogen to prevent deterioration of the oil.

TABLE 1

| | \multicolumn{10}{c|}{Fatty acid composition (wt %)} |
| --- | --- | --- | --- | --- | --- | --- | --- | --- | --- | --- |
| | C14:0 | C16:0 | C16:1 | C16:u | C18:0 | C18:1 | C18:2 | C18:3 | C18:4 | C20:0 |
| Original oil | 8.3 | 19.6 | 11.9 | 6.5 | 3.4 | 12.4 | 1.3 | 1.5 | 2.5 | 0.8 |
| Enriched oil | 0.3 | 4.3 | 6.7 | 3.8 | 1.5 | 16.9 | 1.8 | 1.7 | 3.5 | 1.0 |
| Maize oil | 0.3 | 13.0 | 0.0 | 0.0 | 2.5 | 30.5 | 52.0 | 1.0 | 0.0 | 0.5 |
| 73% enriched fish oil + 27% Maize oil | 0.3 | 6.6 | 4.9 | 2.8 | 1.8 | 20.6 | 15.4 | 1.5 | 2.6 | 0.9 |

| | C20:1 | C20:5 | C20:u | C22:0 | C22:1 | C22:5 | C22:6 | C22:u | C24:0 |
| --- | --- | --- | --- | --- | --- | --- | --- | --- | --- |
| Original oil | 0.3 | 14.5 | 3.6 | 0.0 | 0.3 | 2.5 | 6.5 | 1.3 | 0.0 |
| Enriched oil | 2.8 | 28.1 | 6.8 | 0.0 | 0.0 | 5.6 | 13.6 | 1.9 | 0.0 |
| Maize oil | 0.2 | 0.0 | 0.0 | 0.0 | 0.0 | 0.0 | 0.0 | 0.0 | 0.0 |
| 73% enriched fish oil + 27% Maize oil | 2.1 | 20.5 | 5.0 | 0.0 | 0.0 | 4.1 | 9.9 | 1.4 | 0.0 |

EXAMPLE II

A low temperature solvent fractionation at −70° C. was done on semi refined tuna oil with the composition, mentioned in table 2, under the conditions as mentioned in "Progress in the chemistry of fats and other lipids" vol. 3 Holman R. T. et al 1955, using 4 L of acetone per Kg tuna oil to enrich the oil in DHA and EPA. After removal of the acetone the olein fraction of the tuna oil (=wf(tuna)f) with the composition, mentioned in table 2, was obtained. This fraction was stored in the freezer under nitrogen.

All the ingredients for the enzymic interesterification were stored at ambient for at least one hour. All oils were used as liquid oils. To the tuna oil olein fraction 400 ppm of anti-oxidant (BHT) was added.

The tuna oil olein fraction was divided in different portions. Then the liquid complementary fat was added to each of the tuna oil olein fractions and mixed in. A sample was taken for carbon number and FAME analyses. For the enzymic interesterification a 1,3 specific lipase (*Rhizomucor Miehei*) was used. The lipase was added to the mixed oils in a weight ratio of 40:1 oil:lipase. A nitrogen blanket was put over the mixture to prevent deterioration of the oil. The reaction mixture was put in a magnetic stirred heatblock and the temperature was adjusted to 60° C. After 96 hours the reaction was stopped.

The samples were cleaned through an alumina column to remove FFA, mono- and diglycerides. Carbon number and FAME analyses were done via GC on the samples before and after lipase treatment.

Two methods were used to prove that at least 5% of the total amount of C18:1 and/or C18:2 was bonded on a triglyceride molecule with L1 and/or L2. The first method involves a calculation and gives the maximum amount which is bonded on a triglyceride molecule with L1 and/or L2.

The second method which involves an analytical method gives some information about the minimum amount which is bonded on the same triglyceride molecule with L1 and / or L2.

A statistical programm was used to calculate a carbon number based on the randomized distribution of the fatty acids in a triglyceride molecule. This programm was checked by using the FAME results of a (random) chemical interesterification for a standard interesterified fat mix from palm oil stearin/palm kernel stearin and comparing the calculated carbon number profile with the measured carbon number profile (see table 3). The differences were very small so that it was concluded that the programm gives the correct results. Then the enzymic interesterification according to the invention was tested. The FAME and carbon number of the enzymic interesterified product was measured. The measured carbon number was equated to the calculated carbon number and the differences were very small. Because of this we concluded that the enzymic interesterification resulted in a random distribution of the fatty acids in the triglyceride molecule. In a randomized interesterified product it is possible to calculate the amount of C18:1 and/or C18:2 which is bonded on a triglyceride molecule with L1 and/or L2.

The second method is an analytical method. Two parts of the sample (Band a and Band b) with a certain amount of unsaturation were collected by using Silver-ion HPLC. Band A had about 6 till 9 unsaturations and Band B had 9 till 18 unsaturations. On the triglycerides of the two bands FAME and carbon number analyses were done. From these FAME analyses a carbon number was calculated by using the statistical programm. This carbon number was equated to the measured carbon number. From these analyses and calculations it was possible to calculate the minimum amount of C18:1 and/or C18:2 which was bonded on a triglyceride molecule with L1 and/or L2. The actual amount will be even higher because there was more sample than just the two analyzed bands.

Interesterification experiments were done on the following blends:

| | | |
| --- | --- | --- |
| 55/35/10 | wf(tuna)f/HOSF/SF | |
| 55/45 | wf(tuna)f/ SF | (=comparative example) |

The composition of HOSF and SF are given in table 2.

The experiments were stopped after 120 hours. The carbon number and FAME of the blends and the interesterified blends were determined. The results of the FAME analyses are listed in table 4 and the results of the carbon number analyses are listed in table 5.

The results of the calculated amount of C18:1 and/or C18:2 which is bonded on a triglyceride molecule with L1 and/or L2 are listed in table 6. The results of the analyzed amount of C18:1 and/or C18:2 which is bonded on a triglyceride molecule with L1 and/or L2 are listed in table 7.

Part of the reaction mixture was cleaned by using an alumina column to remove the FFA, mono- and diglycerides and oxidised materials.

This cleaned material was mixed in a ratio of 1/99 with a palm oil olein fraction with a bland smell. This was stored at ambient for three days and evaluated by the panel. The results from the panel using the different products obtained were as follows:

The panel was asked to make a ranking of the samples on fish smell.

| B | A |
| A | B |
| A | B |
| A | B |
| A | B |
| Least flavour → Strongest flavour | |

A: in(wf(tuna)f/HOSF/SF)
B: in(wf(tuna)f/SF)

EXAMPLE III

A fish oil concentrate was made according to the following procedure.

1. Chemical Hydrolysis of Tuna Oil

Method adapted from Ratnayake et al (Fat Sci. Tech. 90 (10), 1988, page 381)

Tuna oil (200 g) was refluxed for 1 hour in an atmosphere of nitrogen with a mixture of 47 g of potassium hydroxide pellets, 260 mls ethanol (96%), and 88 mls deionised water. The saponified mixture was diluted with 500 mls of water and the non-saponifiable matter was extracted with hexane (3×100 ml). The aqueous layer was neutralised with 500 mls of 1M HCl. The free fatty acids were extracted into hexane (3×100 ml). The hexane was removed by evaporation.

2. Urea Fractionation of Tuna Acids

Method adapted from Robles Medina et al JAOCS vol 72 no 5 (1995)

The fatty acids (100 g) were added with stirring to a hot (60° C.) solution of 400 g of Urea and 800 mls of ethanol. The mixture was stirred for 1 hour before the temperature was reduced by 1° C./hour to 4° C. at which temperature the mixture was held for 16 hours. The mixture was fractionated to remove the stearin fraction. The ethanol was removed from the olein fraction by evaporation. The olein was mixed with 250 mls of hexane and 250 mls of 1M HCl. The hexane layer was isolated and the aqueous layer washed with a further 100 ml hexane. The hexane was removed by evaporation.

3. Recombination to Triglyceride

Batch 1

47 g of Tuna acids were mixed with approximately 4 g of glycerol and 4 g of Rhizomucor miehei in a jacketed vessel at 55° C. with a magnetic stirrer. Nitrogen was allowed to blow over the surface to remove any water produced during the reaction. The reaction was allowed to continue for 10 days until the FFA had been substantially reduced. The product after removal of the enzyme by filtration was stirred at 60° C. with 50 g of basic alumina in 100 mls of hexane. The alumina was removed by filtration.

Batch 2

The free fatty acids were divided into 4 samples which were recombined to triglyceride on 12 to 15 g scale in glass vials at 55° C. in a magnetic hot block. Typically 14 g of free fatty acid were mixed with 1.3 g glycerol and 0.7 g *Rhizomucor miehei*. Nitrogen was allowed to flow over the surface to remove water. The reactions were allowed to continue for 1 week. 50 g of product, after removal of the enzyme by filtration, was stirred at 60° C. with 270 g of basic alumina in 100 mls of hexane. The alumina was removed by filtration.

The oil from "Recombination to triglycerides" batch 1 was called D58. The FAME composition of D58 is given in table 8.

Interesterification experiment was done on the following blend:

55/35/10 fish oil concentrate (=D58)/HOSF/SF

The interesterification experiment was done according to the method of example II.

The interesterification experiment was stopped after 115 hours. The FAME and carbon number analysis were done, the results are listed in table 8 and 9. The results of the calculated amount C18:1 and/or C18:2 which is bonded on a triglyceride molecule with L1 and/or L2 of these samples are listed in table 10.

EXAMPLE IV

The interesterification experiments were done according to the method of example II. This time the interesterification reactions were stopped after 46 hours.

The following interesterified blend was used:

55/35/10 wf(TUNA)f (=D40)/HOSF/SF

The FAME and carbon numbers of this interesterified mixtures are listed in table 11 and 12.

D40 being a tuna oil olein fraction, obtained by low temperature solvent fractionation, having about 38 wt % of DHA.

EXAMPLE V

Blends were made of the interesterified mixture mentioned in example IV (=in(FISH)) and a complementary fat/fat blend for the following applications:

| Application | Reference | Blend inside the patent |
| --- | --- | --- |
| Chocolate | Cocoa butter | Cocoa butter/in(FISH) 99/1 |
| Bakery | POf37/df(PO)f 40/60 | POf37/df(PO)f/in(FISH) 40/50/10 |
| Ice cream coatings | Coconut oil | CN/CNs/in(FISH) 90/5/5 |
| Ice cream | PO | PO/in(FISH) 90/10 |
| Non dairy creams | nPOm/df(PO)f 40/60 | nPOm/df(PO)f/in (FISH) 40/40/20 |
| Health margarines/ Health spreads | HS1/SF 13/87 | HS1/SF/in(FISH) 13/77/10 |
| Confectionery fillings | nPOm/df(PO)f 60/40 | nPOm/df(PO)f/in (FISH) 60/20/20 |
| Mayonnaise/ Sauces | SF | SF/in(FISH) 90/10 |
| Dressings | SF | SF/in(FISH) 90/10 |

The range of N-values of the references and measured N-values for the blends are listed in table 13.

EXAMPLE VI

Range style dressings were made according to the following recipe:

|  | wt % |
|---|---|
| Liquid oil | 25.0 |
| Maltodextrin | 20.0 |
| Dried egg yolk | 0.8 |
| Xanthum gum | 0.4 |
| Vinegar | 5.0 |
| Water | 44.8 |

In above recipe two different liquid oils were applied. The liquid oil for the reference was Sunflower oil and the liquid oil according to the invention was as follows:

Sunflower oil/in(D40/HOSF/SF) 90/10

The FAME results of the in(D40/HOSF/SF) are listed in table 11. Results of the NMR measurements of the blend according to the invention are listed in table 13.

A large batch of aqueous phase was manufactured and used for all the dressings. The water and maltodextrin were first blended using a Silverson mixer. The egg yolk, xanthum gum and vinegar were sequentially added whilst continuing to stir with the Silverson until complete mixing had occurred. At this stage the pH=3.25, therefore no further adjustment to the pH was made.

The oils were slowly added to the aqueous phase whilst mixing using the Silverson. Mixing was continued until all the oil had been dispersed. The dressings were transferred to 200 ml plastic sterile bottles.

The viscosities of the samples were determined using a Brookfield Viscometer fitted with a number 4 spindle rotating at 10 rpm.

The samples were contained in identical 200 ml plastic bottles hence the viscosities are directly comparable with each other. For each sample the average of three measurements was taken with the sample being allowed to relax for 1 minute between each 1 minute of shear. The viscosity results of the dressings are listed in table 14.

The oil droplet size distribution was determined using a Malvern Mastersizer using a 45 mm filter. The results of these measurements, as Sauter-mean particle diameter are listed in table 14.

EXAMPLE VII

Spreads were made according to the following recipe:

| Fat phase | |
|---|---|
| Fat Blend | 40% |
| Hymono 7804 | 0.3% |
| Colour (2% β-carotene) | 0.02% |
| Total | 40.32% |
| Aqueous Phase (to pH 5.1) | |
| Water | 56.44% |
| Skimmed Milk Powder | 1.5% |
| Gelatin (270 bloom) | 1.5% |
| Potassium Sorbate | 0.15% |
| Citric Acid Powder | 0.07% |
| Total | 59.66% |

In above recipe two different fat blends were applied. The fat blend for the reference was HS1/Sunflower oil 13/87 and the fat blend according to the invention was as follows:

HS1/Sunflower oil/in(D40/HOSF/SF) 13/77/10

The FAME results of the in(D40/HOSF/SF) are listed in table 11. Results of the NMR measurements of the blend according to the invention are listed in table 13.

The spreads were processed according to the following procedure:

2 kg of material was prepared and processed.

A micro-votator processing line was set up as follows:

| Premix conditions | Stirrer Speed 60 rpm |
|---|---|
|  | Temperature 50° C. |
| pump | Proportioning pump set at 60% |
|  | (30 g/min.). |
| $A_1$ conditions | Shaft speed 1000 rpm |
|  | Temperature set at 8° C. |
| $C_1$ conditions | Shaft speed 1000 rpm |
|  | Temperature set to 10° C. |
| $A_2$ conditions | Shaft Speed 1000 rpm |
|  | Temperature set to 10° C. |
| $C_2$ conditions | Shaft speed 1000 rpm |
|  | Temperature set to 13° C. |

The aqueous phase was prepared by heating the required amount of water to approximately 80° C. and then, using a silverson mixer, slowly mixing in the ingredients. The pH of the system was adjusted to 5.1 by adding 20% Lactic acid solution as required.

A premix was prepared by stirring the fat phase in the premix tank and then slowly adding in the aqueous phase. When addition was complete, the mix was stirred for a further 5 minutes before pumping through the line. When the process had stabilised (around 20 minutes), product was collected for storage and evaluation.

The typical process conditions were as follows:

| Sample | $A_1$ Exit (°C.) | $C_1$ Exit (°C.) | $A_2$ Exit (°C.) | $C_2$ Exit (°C.) | Line Pressure (bar) |
|---|---|---|---|---|---|
| Reference | 13.2 | 18.7 | 13.6 | 15.6 | 0.5 to 2 |
| HS1/SF/ in(D40/ HOSF/SF) 13/77/10 | 12.7 | 19.3 | 13.9 | 16.3 | 1.5 to 3.5 |

For both systems, very good oil continuous low fat spreads were produced using this system.

Evaluations were done on C-value and on conductivity. The C-value in $g/cm^2$ of the spreads was measured by using a cone penetrometer. The conductivity in μ siemens/cm was measured by using a Wayne Kerr.

|  | 20° C. | |
|---|---|---|
| Sample | C-value | Conductivity |
| Reference | 190 | $10^{-5}$ |
| HS1/SF/ in(D40/ HOSF/SF) | 200 | $10^{-5}$ |

All samples spread very easily on grease-proof paper, with no obvious signs of water loss.

EXAMPLE VIII

Ice cream was made according to the following recipe:

|  | wt % |
|---|---|
| Fat blend | 10.0 |
| Skimmed milk powder | 10.0 |
| Icing sugar | 12.0 |
| Corn syrup solids | 4.0 |
| Dextrose monohydrate | 2.0 |
| Sherex IC 9330 ® | 0.6 |
| Water | 61.4 |
| Total | 100.0 |

Sherex IC 9330® is a product from Quest International and comprises mono- and diglycerides admixed with different stabilizers.

In above recipe two different fat blends were applied. The fat blend for the reference was PO/Sunflower oil 90/10 and the fat blend according to the invention was as follows:

PO/in(D40/HOSF/SF) 90/10

The FAME results of the in(D40/HOSF/SF) are listed in table 11. Results of the NMR measurements of the blend according to the invention are listed in table 13.

All ingredients except the water and the fat were mixed. Then the cold water was added to this mixture. This mixture was heated in a water bath till a temperature of 70° C. Then the fully liquid palm oil was added to the mixture while "stirred" in the ultra-turrax. This emulsion was cooled in a water bath at 20° C. untill a temperature of 30° C. was reached. The emulsion was stirred in the ultra-turrax again.

The batch ice cream machine was held for 24 hours at −28° C. prior to use. The emulsion was placed in the batch ice cream machine and stirred for 15 minutes. The resulting ice cream was stored at −20° C. for 24 hours and then evaluated.

The viscosity of the ice cream emulsion, prior to freezing was measured. The overrun and hardness were determined. The viscosity was measured by using the Haake viscometer. Hardness was measured by using a Stevens texture analyzer with a 45° cone at a speed of 0.5 mm/second till a deepness of 2 mm.

| Sample | Overrun (%) | Hardness (gram) |
|---|---|---|
| Reference | 31.5 | 142 |
| PO/in(D40/HOSF/SF) | 31.5 | 189 |

The viscosities of the emulsions were similar.

TABLE 2

FAME data for used components

| FAME | Semi refined tuna oil | wf(TUNA)f | HOSF | Sunflower oil (=SF) |
|---|---|---|---|---|
| C12:0 | 0.1 | 0.0 | 0.0 | 0.0 |
| C12:other | 0.0 | 0.0 | 0.0 | 0.0 |
| C14:0 | 3.5 | 1.7 | 0.1 | 0.1 |
| C14:other | 1.6 | 0.3 | 0.0 | 0.0 |
| C16:0 | 20.8 | 3.1 | 3.9 | 5.9 |
| C16:1 | 5.4 | 7.6 | 0.1 | 0.1 |
| C16:others | 4.7 | 3.2 | 0.0 | 0.0 |

TABLE 2-continued

FAME data for used components

| FAME | Semi refined tuna oil | wf(TUNA)f | HOSF | Sunflower oil (=SF) |
|---|---|---|---|---|
| C18:0 | 6.1 | 0.6 | 4.0 | 4.3 |
| C18:1 | 14.8 | 16.1 | 85.3 | 17.0 |
| C18:2 | 1.2 | 3.1 | 4.6 | 71.1 |
| C18:3 | 0.7 | 0.9 | 0.0 | 0.1 |
| C18:others | 1.9 | 1.7 | 0.0 | 0.0 |
| C20:0 | 0.4 | 0.0 | 0.3 | 0.3 |
| C20:1 | 1.1 | 1.1 | 0.2 | 0.2 |
| C20:2 | 0.0 | 0.2 | 0.0 | 0.0 |
| C20:3 | 0.0 | 0.0 | 0.0 | 0.0 |
| C20:4 | 0.0 | 0.0 | 0.0 | 0.0 |
| C20:5 | 5.1 | 12.0 | 0.0 | 0.0 |
| C20:others | 3.1 | 4.0 | 0.0 | 0.0 |
| C22:0 | 0.0 | 0.0 | 1.1 | 0.7 |
| C22:1 | 0.3 | 0.0 | 0.0 | 0.1 |
| C22:5 | 1.5 | 2.1 | 0.0 | 0.0 |
| C22:6 | 24.8 | 39.6 | 0.0 | 0.0 |
| C22:others | 2.9 | 2.8 | 0.0 | 0.0 |
| C24:0 | 0.0 | 0.0 | 0.3 | 0.2 |
| Others | 0.0 | 0.0 | 0.0 | 0.0 |
| Total | 100.0 | 100.0 | 99.9 | 100.2 |

TABLE 3

Programm check on a chemical interesterification

| FAME | wfPOs/PKs (blend) | in(wfPOs/PKs) | Calculated by statistical programm |
|---|---|---|---|
| C8:0 (%) | 0.6 | 0.6 | |
| C10:0 (%) | 1.1 | 1.1 | |
| C12:0 (%) | 22.5 | 22.5 | |
| C14:0 (%) | 10.0 | 9.9 | |
| C16:0 (%) | 50.2 | 50.5 | |
| C17:0 (%) | 0.1 | 0.1 | |
| C18:0 (%) | 4.3 | 4.3 | |
| C18:1 (%) | 9.9 | 10.0 | |
| C18:2 (%) | 0.6 | 0.7 | |
| C20:0 (%) | 0.3 | 0.3 | |
| C22:0 (%) | 0.1 | 0.0 | |
| Carbon number | | | |
| C28 | 0.1 | 0.0 | 0.0 |
| C30 | 0.2 | 0.0 | 0.0 |
| C32 | 1.4 | 0.4 | 0.2 |
| C34 | 2.7 | 0.7 | 0.4 |
| C36 | 11.5 | 3.3 | 2.5 |
| C38 | 10.4 | 4.2 | 3.4 |
| C40 | 6.4 | 12.7 | 11.4 |
| C42 | 4.1 | 12.3 | 11.7 |
| C44 | 2.4 | 21.9 | 22.1 |
| C46 | 3.7 | 17.0 | 17.8 |
| C48 | 30.5 | 15.5 | 17.0 |
| C50 | 21.7 | 9.0 | 10.2 |
| C52 | 3.8 | 2.5 | 2.9 |
| C54 | 1.1 | 0.4 | 0.3 |
| C56 | 0.1 | 0.1 | 0.0 |
| C58 | 0.1 | 0.0 | 0.0 |

TABLE 4

FAME data for example II

| FAME | TUNAf/HOSF/SF (blend) | in(TUNAf/HOSF/SF) | TUNAf/SF (blend) | in(TUNAf/SF) |
|---|---|---|---|---|
| C12:0 | 0 | 0 | 0 | 0 |
| C12:other | 0 | 0 | 0 | 0 |
| C14:0 | 1 | 1 | 1 | 2 |
| C14:other | 0 | 0 | 0 | 0 |
| C16:0 | 5 | 5 | 6 | 7 |
| C16:1 | 4 | 4 | 4 | 5 |
| C16:other | 2 | 2 | 2 | 2 |
| C18:0 | 3 | 2 | 2 | 2 |
| C18:1 | 44 | 43 | 17 | 17 |
| C18:2 | 12 | 11 | 29 | 27 |
| C18:3 | 0 | 0 | 1 | 1 |
| C18:other | 1 | 1 | 1 | 1 |
| C20:0 | 0 | 0 | 0 | 0 |
| C20:1 | 1 | 1 | 1 | 1 |
| C20:2 | 0 | 0 | 0 | 0 |
| C20:3 | 0 | 0 | 0 | 0 |
| C20:4 | 1 | 1 | 2 | 2 |
| C20:5 | 5 | 5 | 6 | 6 |
| C20:other | 1 | 1 | 1 | 1 |
| C22:0 | 1 | 1 | 0 | 0 |
| C22:1 | 0 | 0 | 0 | 0 |
| C22:5 | 1 | 1 | 1 | 1 |
| C22:6 | 18 | 20 | 23 | 23 |
| C22:other | 1 | 1 | 2 | 2 |
| C24:0 | 0 | 0 | 0 | 0 |

TABLE 5

Carbon number data for example II

| Carbon number | TUNAf/HOSF/SF (blend) | in(TUNAf/HOSF/SF) | TUNAf/SF (blend) | in(TUNAf/SF) |
|---|---|---|---|---|
| C36 | 0.0 | 0.0 | 0.0 | 0.0 |
| C38 | 0.0 | 0.0 | 0.0 | 0.0 |
| C40 | 0.0 | 0.0 | 0.0 | 0.0 |
| C42 | 0.0 | 0.0 | 0.0 | 0.0 |
| C44 | 0.0 | 0.0 | 0.0 | 0.0 |
| C46 | 0.0 | 0.0 | 0.0 | 0.7 |
| C48 | 0.3 | 1.0 | 0.6 | 2.8 |
| C50 | 1.5 | 4.4 | 2.1 | 6.8 |
| C52 | 9.9 | 13.4 | 11.3 | 15.3 |
| C54 | 48.9 | 26.6 | 38.4 | 21.6 |
| C56 | 10.3 | 17.6 | 12.8 | 17.1 |
| C58 | 11.6 | 20.8 | 13.7 | 16.9 |
| C60 | 10.1 | 8.2 | 12.6 | 9.8 |
| C62 | 7.4 | 8.0 | 8.6 | 8.9 |
| C64 | 0.0 | 0.0 | 0.0 | 0.0 |
| C66 | 0.0 | 0.0 | 0.0 | 0.0 |
| C68 | 0.0 | 0.0 | 0.0 | 0.0 |
| Total | 100.0 | 100.0 | 100.1 | 99.9 |

TABLE 6

Calculated data for example II of the amount of C18:1 and/or C18:2 which is bonded on a triglyceride molecule with L1 and/or L2.
55/35/10 wf(tuna)f / HOSF / SF

| Carbon number | Analyzed (wt %) | Calculated (wt %) | O/Ln + X (wt %) + L1/L2 | O/Ln + O/Ln (wt %) + L1/L2 | O/Ln wt % | wt % of the total added amount c18:1 and/or C18:2 bonded on a molecule with L1 and/or L2 |
|---|---|---|---|---|---|---|
| C36 | 0.0 | 0.0 | 0.0 | 0.0 | 0.0 | 0.0 |
| C38 | 0.0 | 0.0 | 0.0 | 0.0 | 0.0 | 0.0 |
| C40 | 0.0 | 0.0 | 0.0 | 0.0 | 0.0 | 0.0 |
| C42 | 0.0 | 0.0 | 0.0 | 0.0 | 0.0 | 0.0 |
| C44 | 0.0 | 0.0 | 0.0 | 0.0 | 0.0 | 0.0 |
| C46 | 0.0 | 0.1 | 0.0 | 0.0 | 0.0 | 0.0 |
| C48 | 0.3 | 0.7 | 0.0 | 0 0 | 0.0 | 0.0 |
| C50 | 1.5 | 3.7 | 0.0 | 0.0 | 0.0 | 0.0 |
| C52 | 9.9 | 11.8 | 0.3 | 0.0 | 0.1 | 0.2 |
| C54 | 48.9 | 24.6 | 2.7 | 0.0 | 0.9 | 1.7 |
| C56 | 10.3 | 16.8 | 7.2 | 4.7 | 5.3 | 10.0 |
| C58 | 11.6 | 23.9 | 2.8 | 16.0 | 10.8 | 20.1 |
| C60 | 10.1 | 7.9 | 4.8 | 0.0 | 1.4 | 2.7 |
| C62 | 7.4 | 8.2 | 6.9 | 0.0 | 2.0 | 3.7 |
| C64 | 0.0 | 1.3 | 0.0 | 0.0 | 0.0 | 0.0 |
| C66 | 0.0 | 1.0 | 0.0 | 0.0 | 0.0 | 0.0 |
| Total | 100.0 | 100.0 | | | 20.6 | 38.4 | x = all fatty acids except O and Ln (C18:1 and C18:2)
/ = or

TABLE 7

Analyzed results of example II of the amount of C18:1 and/or C18:2 which are bonded on a triglyceride molecule with L1 and/or L2.
55/35/10 wf(tuna)f / HOSF / SF

| | HPLC band | Band as % TAGs (g/100 g) | Sum of Cno's containing target TAG in band (% wt) | Sum of target acids in band (% wt) | Target acids in target TAGs in band (g/100 g) | Target acids in total FAME on TG (% wt) | Therefore target acids in target TAGS(% wt on total FAME) |
|---|---|---|---|---|---|---|---|
| in(TUNAf HOSF/SF) | A | 24.4 | 93.0 | 47.9 | 10.9 | 54.6 | 20.0 |
| | B | 20.4 | 85.0 | 20.9 | 3.6 | 54.6 | 6.6 |
| | | | | | | Total: | 26.6 |

TABLE 8

FAME data for example III

| FAME | D58 | in (D58/HOSF/SF) |
|---|---|---|
| C14:0 | 0.1 | 0.1 |
| C14:other | 0.5 | 0.1 |
| C16:0 | 0.1 | 2.2 |
| C16:1 | 1.0 | 0.5 |
| C16:other | 3.4 | 1.5 |
| C18:0 | 0.2 | 2.3 |
| C18:1 | 0.9 | 39.1 |
| C18:2 | 1.8 | 11.0 |
| C18:3 | 0.8 | 0.4 |
| C18:other | 3.5 | 1.5 |
| C20:0 | 0.0 | 0.2 |
| C20:1 | 0.1 | 0.1 |
| C20:2 | 0.0 | 0.0 |
| C20:3 | 0.4 | 0.3 |
| C20:4 | 4.6 | 2.1 |
| C20:5 | 16.1 | 7.1 |
| C20:other | 1.4 | 0.7 |
| C22:0 | 0.0 | 0.6 |
| C22:1 | 0.1 | 0.0 |
| C22:5 | 2.0 | 1.1 |
| C22:6 | 27.3 | 26.8 |
| C22:other | 5.6 | 2.5 |
| C24:0 | 0.0 | 0.0 |
| Total | 99.9 | 100.2 |

TABLE 9

Carbon number data for example III

| Carbon number | D58/HOSF/SF (blend) | in(D58/HOSF/SF) |
|---|---|---|
| C36 | 0.0 | 0.0 |
| C38 | 1.0 | 1.3 |
| C40 | 0.9 | 0.6 |
| C42 | 1.2 | 1.3 |
| C44 | 2.6 | 0.4 |
| C46 | 2.6 | 0.6 |
| C48 | 1.1 | 0.9 |
| C50 | 2.2 | 1.5 |
| C52 | 4.0 | 6.8 |
| C54 | 21.0 | 21.1 |
| C56 | 5.6 | 15.4 |
| C58 | 10.1 | 25.0 |
| C60 | 13.4 | 10.6 |
| C62 | 14.7 | 10.6 |
| C64 | 9.7 | 2.6 |
| C66 | 9.9 | 1.3 |
| C68 | 0.0 | 0.0 |
| Total | 100.0 | 100.0 |

TABLE 10

Calculated data for example III of the amount of C18:1 and/or C18:2 which is bonded on a triglyceride molecule with L1 and/or L2.
55/35/10 fish oil concentrate (=D58) / HOSF / SF

| Carbon number | Analyzed (wt %) | Calculated (wt %) | O/Ln + X (wt % + L1/L2 | O/Ln + O/Ln (wt %) + L1/L2 | O/Ln wt % | wt % of the total added amount c18:1 and/or C18:2 bonded on a molecule with L1 and/or L2 |
|---|---|---|---|---|---|---|
| C36 | 0.0 | 0.0 | 0.0 | 0.0 | 0.0 | 0.0 |
| C38 | 1.3 | 0.0 | 0.0 | 0.0 | 0.0 | 0.0 |
| C40 | 0.6 | 0.0 | 0.0 | 0.0 | 0.0 | 0.0 |
| C42 | 1.3 | 0.0 | 0.0 | 0.0 | 0.0 | 0.0 |
| C44 | 0.4 | 0.0 | 0.0 | 0.0 | 0.0 | 0.0 |
| C46 | 0.6 | 0.0 | 0.0 | 0.0 | 0.0 | 0.0 |
| C48 | 0.9 | 0.0 | 0.0 | 0.0 | 0.0 | 0.0 |
| C50 | 1.5 | 0.6 | 0.0 | 0.0 | 0.0 | 0.0 |
| C52 | 6.8 | 4.5 | 0.0 | 0.0 | 0.0 | 0.0 |
| C54 | 21.1 | 19.5 | 0.5 | 0.0 | 0.2 | 0.3 |
| C56 | 15.4 | 14.3 | 3.9 | 5.5 | 4.8 | 9.6 |
| C58 | 25.0 | 29.8 | 6.7 | 13.6 | 10.5 | 21.0 |
| C60 | 10.6 | 11.3 | 8.1 | 0.0 | 2.4 | 4.9 |
| C62 | 10.6 | 15.0 | 12.7 | 0.0 | 3.7 | 7.4 |
| C64 | 2.6 | 2.6 | 0.0 | 0.0 | 0.0 | 0.0 |
| C66 | 1.3 | 2.4 | 0.0 | 0.0 | 0.0 | 0.0 |
| Total | 100.0 | | | | 21.6 | 43.1 | x = all fatty acids except O and Ln (C18:1 and C18:2)
/ = or

TABLE 11

FAME data for example IV

| FAME | D40 | in(D40/HOSF/SF) |
|---|---|---|
| C12:0 | 0 | 0 |
| C12:other | 0 | 0 |
| C14:0 | 4 | 2 |
| C14:other | 1 | 1 |
| C16:0 | 7 | 5 |
| C16:1 | 4 | 2 |
| C16:other | 0 | 2 |
| C18:0 | 2 | 3 |
| C18:1 | 16 | 41 |
| C18:2 | 1 | 10 |
| C18:3 | 1 | 1 |
| C18:other | 2 | 1 |
| C20:0 | 0 | 0 |
| C20:1 | 2 | 1 |
| C20:2 | 0 | 0 |
| C20:3 | 0 | 0 |
| C20:4 | 0 | 1 |
| C20:5 | 7 | 4 |
| C20:other | 2 | 0 |
| C22:0 | 0 | 1 |
| C22:1 | 3 | 2 |
| C22:5 | 4 | 2 |
| C22:6 | 38 | 20 |
| C22:other | 2 | 1 |
| C24:0 | 0 | 0 |

TABLE 12

Carbon number data for example IV

| Carbon number | D40/HOSF/SF (blend) | in(D40/HOSF/SF) |
|---|---|---|
| C42 | 0.2 | 0.3 |
| C44 | 0.9 | 0.9 |
| C46 | 1.4 | 1.3 |
| C48 | 1.4 | 1.7 |
| C50 | 2.9 | 6.5 |
| C52 | 11.7 | 11.2 |
| C54 | 49.3 | 27.0 |
| C56 | 8.7 | 14.8 |
| C58 | 9.4 | 21.6 |
| C60 | 7.5 | 6.4 |
| C62 | 5.4 | 7.2 |
| C64 | 1.2 | 1.1 |
| C66 | 0.0 | 0.0 |
| C68 | 0.0 | 0.0 |
| Total | 100.0 | 100.0 |

TABLE 13

N-values for blends example VI

| Application | Blend | N-5 n.s. (%) | N-10 n.s. (%) | N-20 n.s. (%) | N-35 n.s. (%) |
|---|---|---|---|---|---|
| Chocolate | Typical values | 85–95 | 80–95 | 55–65 | <1 |
| | 99/1 CCB/in(D40/HOSF/SF) | 89.4 | 86.0 | 60.4 | 0.0 |
| Bakery | Typical values | 40–80 | 30–75 | 20–45 | <15 |
| | 40/50/10 POf37/dfPOf/in(D40/HOSF/SF) | 43.7 | 36.8 | 21.7 | 0.0 |
| Ice cream | Typical values | 65–90 | >35 | >15 | <1 |

TABLE 13-continued

N-values for blends example VI

| Application | Blend | N-5 n.s. (%) | N-10 n.s. (%) | N-20 n.s. (%) | N-35 n.s. (%) |
|---|---|---|---|---|---|
| coatings | 90/5/5 CN/CNs/ in(D40/HOSF/SF) | 71.8 | 60.6 | 32.4 | 0.2 |
| Ice cream | Typical values 90/10 PO/ in(D40/HOSF/SF) | 40–60 52.6 | | 15–30 21.9 | <5 3.6 |
| Non dairy creams | Typical values 40/40/20 nPOm/ dfPOf/ in(D40/HOSF/SF) | 1–70 52.0 | | 0–37 16.0 | 0–11 0.0 |
| Health margarines/ Health spreads | Typical values 13/77/10 HSB1/ SF/ in(D40/HOSF/SF) | 7–20 15.4 | | 3–12 10.0 | <2.5 1.2 |
| Confectionery filling | Typical values 60/20/20 nPOm/ dfPOf/ in(D40/HOSF/SF) | >50 62.7 | >40 61.9 | >25 42.8 | <1.5 0.0 |
| Mayonnaise/ Sauces | Typical values 90/10 SF/ in(D40/HOSF/SF) | 0–10 0.0 | 0–5 0.0 | <1 0.0 | <0.5 0.0 |
| Dressings | Typical values 90/10 SF/ in(D40/HOSF/SF) | 0–10 0.0 | 0–5 0.0 | <1 0.0 | <0.5 0.0 |

TABLE 14

Evaluation results of example VI

| OIL | VISCOSITY cP | SAUTER MEAN PARTICLE DIAMETER μM |
|---|---|---|
| Reference | 5940 | 19.30 |
| Sunflower oil/ in(D40/HOSF/SF) 90/10 | 5766 | 29.68 |

We claim:

1. An interesterified triglyceride-composition, comprising at least two long chain poly-unsaturated fatty acids $L_1$ and $L_2$, both having at least 3 unsaturations and having at least 20 carbon atoms from which $L_1$ is the most abundant and $L_2$ is the second most abundant, wherein the triglyceride composition contains at least 20 wt % of $L_1$, while the weight ratio $L_1:L_2$ is at least 2, and the triglyceride composition also contains an oxidative stabilizing amount of mono- and di-unsaturated fatty acids with 18 carbon atoms, such that the amount of $C_{18:2}$ unsaturated fatty acids is more than 7 wt % and the amount of $C_{18:1}$ unsaturated fatty acids is at least 30 wt % and wherein at least 5 wt % of the mono- and/or di-unsaturated fatty acids with 18 carbon atoms are bonded on a triglyceride molecule in which at least $L_1$ and/or $L_2$ are present, said composition being characterized by its reduced or lack of odor or fish smell and off-taste.

2. Triglyceride composition according to claim 1, wherein the amount of $L_1$ is more than 30 wt %, while the weight ratio $L_1:L_2$ is at least 3.

3. Triglyceride composition according to claims 1 or 2, wherein the amount of $L_1$ is at least 40 wt % and the weight ratio of $L_1:L_2$ is at least 3.5.

4. Triglyceride composition according to claim 1, wherein the amount of $C_{18:1}$ is at least 40 wt %.

5. Triglyceride composition according to claim 1, wherein the amount of $C_{18:2}$ is more than 10 wt %.

6. Triglyceride composition according to claim 1, wherein the weight ratio $C_{18:1}/C_{18:2}$ is more than 1.

7. Triglyceride composition according to claim 1, wherein $L_1$ $C_{22:6}$ (DHA).

8. Triglyceride composition according to claim 1, wherein $L_2$ $C_{20:5}$ (EPA).

9. Triglyceride composition according to claim 1, wherein $L_1$ is EPA and $L_2$ is DHA.

10. Blends of triclycerides comprising:

0.3–95 wt % of the interesterified triglyceride composition according to claim 1, and 99.7–5 wt % of a structuring fat, having saturated fatty acid residues with 12–24 carbon atoms and wherein the structuring fat has a solid fat content (NMR-pulse; not stabilized) of more than 15 at 20° C.

11. Blends of triglycerides according to claim 10 comprising 5–80 wt % of said interesterified triglyceride composition and 95–20 wt % of said structuring fat with saturated $C_{12}$–$C_{24}$ fatty acid residues.

12. Blends according to claim 10, wherein the structuring fat has a solid fat content (NMR-pulse; not stabilized) of more than 20 at 20° C.

13. Blends according to claim 10, wherein said structuring fat is selected from cocoa butter equivalents, cocoa butter, palm oil or fractions thereof, palmkernel oil or fractions thereof, interesterified mixtures of above fats or fractions or hardened components thereof.

14. Blends according to claim 10, wherein the blend displays a solid fat content (NMR-pulse; not stabilized) of 0–85 at 5° C. and less than 30 at 35° C.

15. A triglyceride compositions according to claim 1 or blends wherein the composition further comprises an effective amount of an oxidation stabilizer selected from the group consisting of natural or synthetic tocopherols, BHT, BHA and free radical scavengers.

16. Food products, selected from the group consisting of spreads, margarine, cream alternative, infant food, chocolate, confectionery, bakery products, sauces, icecreams, ice-cream coatings, mayonnaise, dressings, cheese, soups,, topping, enteral or parental products comprising a fat phase, wherein the fat phase contains the interesterified triglyceride composition according to claim 1.

17. A triglyceride composition according to claim 1 wherein the amount of $C_{18:2}$ is more than 15 wt % and the weight ratio $C_{18:1}/C_{18:2}$ is more than 2.

18. A blend according to claim 10 comprising 20–70 wt % of said triglyceride composition and 80–30 wt % of said structuring fat.

* * * * *